United States Patent
Heinz et al.

(10) Patent No.: US 11,391,900 B2
(45) Date of Patent: Jul. 19, 2022

(54) TALCUM-FREE FLAME RETARDANT FIBER OPTICAL CABLE WITH MICRO-MODULES

(71) Applicant: CORNING RESEARCH & DEVELOPMENT CORPORATION, Corning, NY (US)

(72) Inventors: Michael Alexander Heinz, Berlin (DE); Ravinder Kumar Kinnera, Bogotá (CO)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 77 days.

(21) Appl. No.: 17/091,053

(22) Filed: Nov. 6, 2020

(65) Prior Publication Data

US 2021/0149137 A1 May 20, 2021

Related U.S. Application Data

(60) Provisional application No. 62/937,315, filed on Nov. 19, 2019.

(51) Int. Cl.
*G02B 6/44* (2006.01)

(52) U.S. Cl.
CPC .................. *G02B 6/4436* (2013.01)

(58) Field of Classification Search
CPC ... G02B 6/4494; G02B 6/4434; G02B 6/4436
See application file for complete search history.

(56) References Cited

U.S. PATENT DOCUMENTS

| 8,031,997 B2 | 10/2011 | Overton |
| 8,772,638 B2 | 7/2014 | Lumachi et al. |

(Continued)

FOREIGN PATENT DOCUMENTS

| DE | 19728195 A1 | 1/1999 |
| EP | 0241330 A2 | 10/1987 |

(Continued)

OTHER PUBLICATIONS

European Patent Application No. 20208291.3, Search Report dated Apr. 15, 2021; 8 pages; European Patent Office.

(Continued)

*Primary Examiner* — Sung H Pak
*Assistant Examiner* — Hoang Q Tran
(74) *Attorney, Agent, or Firm* — William D. Doyle

(57) ABSTRACT

Embodiments of the disclosure relate to an optical fiber cable. The optical fiber cable includes a cable sheath having an interior surface and an exterior surface. The interior surface defines a longitudinal bore and the exterior surface defines an outermost surface of the optical fiber cable. The optical fiber cable also includes a plurality of micromodules disposed within the longitudinal bore. Each micromodule of the plurality of micromodules includes a micromodule jacket surrounding at least one optical fiber. The micromodule jacket of each of the plurality of micromodules is made of a first polymer composition having a first melt temperature, and the cable sheath is made of a second polymer composition having a second melt temperature that is less than the first melt temperature. The first polymer composition and the second polymer compositions are both low smoke, zero halogen materials.

16 Claims, 1 Drawing Sheet

(56) References Cited

U.S. PATENT DOCUMENTS

| | | |
|---|---|---|
| 9,213,158 B2 | 12/2015 | Consonni et al. |
| 9,658,418 B2 | 5/2017 | Ceschiat et al. |
| 2012/0213483 A1 | 8/2012 | Risch et al. |
| 2013/0129290 A1 | 5/2013 | Keller et al. |
| 2016/0041354 A1* | 2/2016 | Guenter ............... G02B 6/4436 385/86 |
| 2016/0075849 A1* | 3/2016 | Kaul ....................... C08L 77/00 524/430 |

FOREIGN PATENT DOCUMENTS

| | | |
|---|---|---|
| EP | 1664575 A2 | 6/2006 |
| WO | 2005/031186 A2 | 4/2005 |
| WO | 2006/010359 A1 | 2/2006 |
| WO | 2015/102819 A1 | 7/2015 |

OTHER PUBLICATIONS

TFK Group, "The Information Gateway—Fiber Optic Cables", Available Online at <https://www.tfkable.com/download/files/upload/files/Fibre_Optic_Cables(1).pdf>, 96 pages.

* cited by examiner

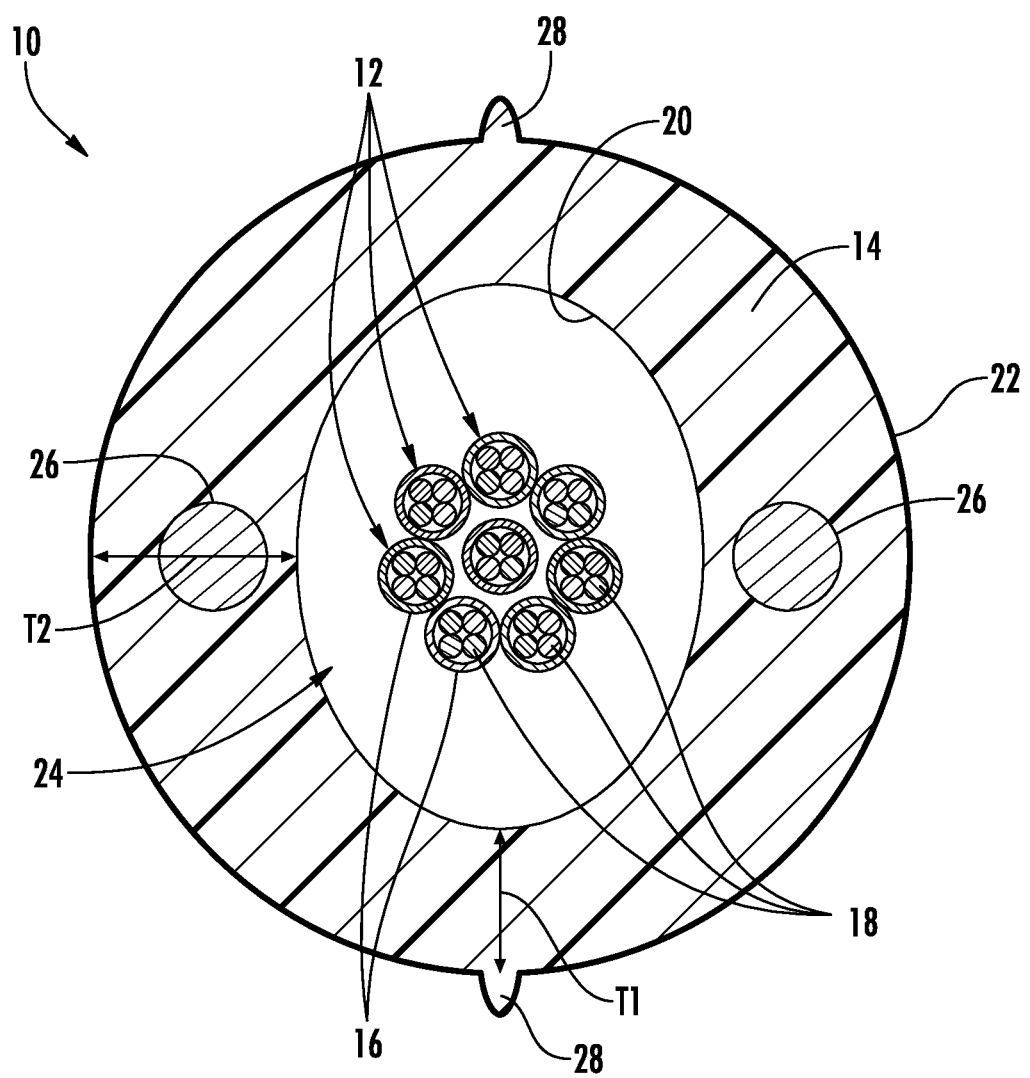

TALCUM-FREE FLAME RETARDANT FIBER OPTICAL CABLE WITH MICRO-MODULES

CROSS-REFERENCED TO RELATED APPLICATIONS

This application claims the benefit of priority under 35 U.S.C. § 119 of U.S. Provisional Application Ser. No. 62/937,315 filed on Nov. 19, 2019, the content of which is relied upon and incorporated herein by reference in its entirety.

BACKGROUND

The disclosure relates generally to a fiber optic cable and more particularly to a talcum-free flame retardant fiber optic cable configured for indoor applications, especially in riser ducts. Certain current standards require a degree of flame retardancy for construction products, especially for indoor applications. Some of these standards extend to electrical and telecommunication cables. Often, to achieve the requisite degree of flame retardance for these cables, desired mechanical properties may have to be compromised for the cable construction. Besides reliability over its life, the compromised mechanical properties can also make installation of the optical fiber cable more difficult.

SUMMARY

In one aspect, the present disclosure relates to an optical fiber cable. The optical fiber cable includes a cable sheath having an interior surface and an exterior surface. The interior surface defines a longitudinal bore and the exterior surface defines an outermost surface of the optical fiber cable. The optical fiber cable also includes a plurality of micromodules disposed within the longitudinal bore. Each micromodule of the plurality of micromodules includes a micromodule jacket surrounding at least one optical fiber. The micromodule jacket of each of the plurality of micromodules is made of a first polymer composition having a first melt temperature, and the cable sheath is made of a second polymer composition having a second melt temperature that is less than the first melt temperature. The first polymer composition and the second polymer compositions are both low smoke, zero halogen materials.

In another aspect, the present disclosure relates to an optical fiber cable. The optical fiber cable includes a cable sheath having an interior surface and an exterior surface. The interior surface defines a longitudinal bore, and the exterior surface defines an outermost surface of the optical fiber cable. The optical fiber cable also includes a plurality of micromodules disposed within the longitudinal bore. Each micromodule of the plurality of micromodules has a micromodule jacket surrounding at least one optical fiber. The micromodule jacket of each of the plurality of micromodules is made of a first polymer composition including 40 wt % to 50 wt % of a polypropylene-based polymer, 15 wt % to 30 wt % of $CaCO_3$, and 15 wt % to 30 wt % of magnesium di-hydrate (MDH). The first polymer composition has a first melt temperature of at least 200° C. The cable sheath is made of a second polymer composition having a second melt temperature of less than 190° C.

In still another aspect, the present disclosure relate to a method of making an optical fiber cable. In the method, a bundle of micromodules is provided. Each micromodule includes a micromodule jacket surrounding at least one optical fiber. Each micromodule jacket comprises a first low smoke, zero halogen (LSZH) polymer composition having a first melt temperature. Further, in the method, a cable sheath made of a second LSZH polymer composition is extruded around the bundle of micromodules at a second temperature below the first melt temperature. The first LSZH polymer composition is immiscible with the second LSZH polymer composition. Additional features and advantages will be set forth in the detailed description that follows, and in part will be readily apparent to those skilled in the art from the description or recognized by practicing the embodiments as described in the written description and claims hereof, as well as the appended drawing.

It is to be understood that both the foregoing general description and the following detailed description are merely exemplary, and are intended to provide an overview or framework to understand the nature and character of the claims.

BRIEF DESCRIPTION OF THE DRAWING

The accompanying drawing is included to provide a further understanding and are incorporated in and constitute a part of this specification. The drawing illustrates one or more embodiment(s), and together with the description serves to explain principles and the operation of the various embodiments.

FIG. 1 depicts a longitudinal cross-section of a talcum-free optical fiber cable, according to an exemplary embodiment.

DETAILED DESCRIPTION

Various embodiments of an optical fiber cable are provided. The optical fiber cable is designed for indoor use, especially in riser ducts. The optical fiber cable includes a plurality of micromodules contained within a cable sheath. The micromodules have a jacket that is made of a composition different from the composition of the cable sheath. In particular, the micromodule jacket disclosed herein is a highly-filled polypropylene-based composition having a higher melting temperature than that of the cable sheath. The higher melting temperature and different composition avoid sticking between the cable sheath and the micromodule jacket during manufacture, in particular during extrusion of the cable sheath over the bundled of micromodules. Conventionally, the issue of sticking was addressed by coating the micromodules in talcum prior to extruding the cable sheath around the micromodules. However, during installation of the optical fiber cable, especially during installation in a riser duct, the talcum would spill out onto the cable installer, causing irritation. By utilizing the presently disclosed cable construction, including the presently disclose micromodule jacket composition, the optical fiber cable can be made talcum-free as the problem for which talcum was added to the cable is otherwise addressed. Advantageously, the micromodule jacket provides the additional benefit that the micromodule can be easily pulled 20 m or more from the cable sheath and around multiple loops. These and other aspects and advantages will be discussed in relation to the exemplary embodiments disclosed herein. These embodiments of the optical fiber cable disclosed herein are provided by way of example and not by way of limitation.

FIG. 1 depicts an embodiment of an optical fiber cable 10, particularly for indoor use and especially for riser applications, that includes a plurality of micromodules 12 contained within a cable sheath 14. The micromodules 14 are each made up of a micromodule jacket 16 surrounding one or more optical fibers 18. In the embodiment depicted in FIG. 1, each micromodule 14 includes four optical fibers 18 within the micromodule jacket 16. In embodiments, each micromodule 14 contains from one to twelve optical fibers 18; however, in other embodiments, the number of optical fibers 18 contained within each micromodule can be greater than twelve as dictated by consumer demand. Further, in the embodiment depicted, the optical fibers 18 are bare fibers, but in other embodiments, optical fibers 18 of a different type, such as tightly buffered fibers, may be used. In embodiments, the micromodule jacket 16 surrounding the optical fibers 18 has a thickness of 0.05 mm to 0.5 mm, particularly about 0.1 mm. The micromodule jacket 16, in embodiments, is configured to be "pinchable," meaning that an installer can easily rupture the micromodule jacket 16 to access the optical fibers 18 therein by pinching the micromodule jacket 16 between the installer's fingers.

As shown in FIG. 1, the micromodules 12 are contained within a cable sheath 14. The cable sheath 14 has an inner surface 20 and an outer surface 22. The inner surface 20 defines a longitudinal bore 24 in which the micromodules 12 are disposed. In embodiments, the longitudinal bore 24 has an elliptical cross-section. The outer surface 22 defines the outermost surface of the optical fiber cable 10. The inner surface 20 and the outer surface 22 define a thickness of the cable sheath 14 therebetween. In embodiments in which the longitudinal bore 24 defines an elliptical cross-section, the cable sheath 14 has a variable thickness around its circumference. The thickness varies from a first thickness T1 to a second thickness T2 in which the first thickness T1 is less than the second thickness T2. In embodiments, the first thickness is from 1.3 mm to 1.8 mm, and the second thickness T2 is from 2.0 mm to 2.4 mm.

In embodiments, the optical fiber cable 10 also includes one or more strength elements 26 embedded in the cable sheath 14. In embodiments, the strength elements 26 are located in the region of the cable sheath 14 having the second, larger thickness T2. In embodiment depicted in FIG. 1, there are two strength elements 26 arranged diametrically within the cable sheath 14. In embodiments, the strength elements 26 are glass-reinforced plastic rods, metal wires, or bundles of aramid strands, among others. In embodiments, the cable sheath 14 also includes access indicators 28. In the embodiment depicted, the access indicators 28 are ridges running along the length of the optical fiber cable 10 that serve as visual and tactile indicators of where the cable sheath 14 should be opened to provide access to the micromodules 12 in the longitudinal bore 24. In other embodiments, the access indicators 28 are grooves cut into the thickness of the cable sheath 12.

In order to provide fiber access to different levels of a multi-story building, the cable sheath 12 is opened a various points using a cutting tool that creates a hole along the length of the optical fiber cable 10. During a typical installation, the optical fiber cable 10 may be opened on one floor so that the micromodules 12 can be cut, and on a lower floor, the optical fiber cable 10 is opened again so that the cut micromodule 12 can be pulled out from the longitudinal bore 24 to the exterior of the optical fiber cable 10 for routing from a riser duct horizontally on a floor of a premises. The elliptical shape of the longitudinal bore 24 helps ensure that the micromodules 12 are able to move towards the opposite side of the cable 10 from the cut so as to avoid accidentally cutting the optical fibers 18.

Having described the structure of the optical fiber cable 10, the material of the cable sheath 14 and the micromodule jacket 16 will now be discussed. Because the optical fiber cable 10 is configured for indoor use, the cable sheath 14 and the micromodule jacket 16 are made of flame retardant materials. In embodiments, the flame retardant materials of the cable sheath 14 and micromodule jacket 16 qualify as low-smoke, zero halogen (LSZH) flame retardant materials. In embodiments, the cable sheath 14 is made from ethylene vinyl acetate (EVA), ethylene-butyl-acrylate (EBA), and/or polyethylene (PE) with flame retardant mineral fillers, such as aluminum tri-hydrate (ATH) or magnesium di-hydrate (MDH). In embodiments, the mineral fillers comprise 50 percent by weight (wt %) to 65 percent by weight (wt %) of the polymer composition of the cable sheath 14. In embodiments, the polymer composition of the cable sheath 14 has a density of at least 1.5 g/cm$^3$, a tensile strength of at least 10 MPa, an elongation at break of at least 150%, a limiting oxygen index of at least 36% (up to 50%), and a melting temperature of less than 190° C. (in particular in the range of 150° C. to 180° C.). When manufacturing the optical fiber cable 10, the cable sheath 14 is extruded around the micromodules 16.

Conventional cables used similar materials for both the cable sheath and the micromodule jacket. During extrusion, the heat from the molten polymer composition of the cable sheath caused the micromodule jacket to heat up to around its melting temperature, which was about the same temperature as the cable sheath because they were made of similar materials. This led to sticking between the micromodules and the cable sheath, and the sticking made pulling the micromodules through the cable sheath during installation difficult or, in some cases, impossible. To address this problem, the micromodules of conventional cables were coated with talcum to prevent sticking between the micromodule jacket and the cable sheath. However, as mentioned above, the talcum is an irritant for cable installers when pulling the micromodules out of the cable sheath. Additionally, application of talcum to the micromodules limited line speed and introduced another source of manufacturing defects.

Thus, according to the present disclosure, the micromodule jackets 16 of the optical fiber cable 10 are made of a material different from the cable sheath 14. In particular, the micromodule jackets 16 are made from a material having a higher melting temperature, and containing a different base polymer than the material of the cable sheath 14. Utilizing a polymer composition with a higher melt temperature, such as 200° C. or above, means that the micromodule jacket will not melt or become tacky when the cable sheath with a lower melting temperature, such as 190° C. or below, is extruded around the micromodules. Further, because the polymer compositions of the micromodule jacket has low to no miscibility in the polymer composition of the cable sheath, the micromodule jacket would not stick to the cable sheath even if it were to melt or become tacky.

According to the present disclosure, the micromodule jacket 16 is comprised of a polypropylene-based polymer and a mixture of mineral fillers, including MDH and chalk (CaCO$_3$). In an embodiment, the polypropylene-based polymer is a block polymer of polypropylene and polyethylene. Advantageously, a copolymer of polypropylene and polyethylene maintains the higher melt temperature of the polypropylene, while the polyethylene component enhances the flexibility of the normally more rigid polypropylene. One example of such polypropylene copolymers are commercially available from LyondellBasell, produced via the Cat-alloy process. Other similar, commercially-available (co) polymers may also be used. In embodiments, the polymer composition of the micromodule jacket 16 includes 40 percent by weight (wt %) to 50 percent by weight (wt %) of the polypropylene-based polymer.

As mentioned, the filler component of the micromodule jacket 16 polymer composition includes chalk and MDH. In an embodiment, chalk is present in an amount of 15 wt % to 30 wt % of the polymer composition, and in an embodiment, MDH is present in an amount of 15 wt % to 30 wt % of the polymer composition. In embodiments, MDH is used in the micormodule jacket 16 because of its relatively high decomposition temperature. Certain other mineral flame retardants, such as ATH, would decompose at processing temperatures associated with the polypropylene-based polymer. Advantageously, the high filling of the micromodule jacket 16 with the inorganic filler materials allows the micromodule jacket 16 to rupture easily to access the optical fibers 18 therein. In particular, a cable installer can rupture the micromodule jacket 16 by pinching the micromodule jacket 16 between his or her fingers, and the optical fibers 18 can be used as a rip cord to tear the micromodule jacket 16.

In embodiments, the polymer composition of the micromodule jacket 16 also includes stabilizers in an amount of 0 wt % to 2 wt %. The polymer composition of the micromodule jacket 16 as described above had the properties as shown in Table 1.

TABLE 1

| Properties of Micromodule Jacket Polymer Composition | |
|---|---|
| Property | Measurement |
| Tensile Strength | 9-10 MPa |
| Elongation at break | 180-300% |
| Density | 1.35-1.4 g/cm$^3$ |
| Limiting Oxygen Index | 32% |
| Melt Flow Rate (230° C., 5 kg) | 14-22 g/10 min |
| Hardness | 60 Shore D |

In comparison to the polymer composition of the cable sheath 14, the polymer composition of the micromodule jacket 16 has a slightly lower tensile strength, which contributes to the pinchability of the mircromodule jacket 16. Additionally, the hardness is relatively low at Shore D of 60. The density of the is also slightly lower than the density of the cable sheath because the polymer composition of the micromodule jacket 16 is less filled than the composition of the cable sheath 14, which also contributes to the slightly lower limiting oxygen index.

Despite the absence of talcum between the micromodules 12 and the cable sheath 14, the micromodules 12 can still be easily pulled from the cable sheath 12. One way to test the ability of the micromodules 12 to pull out from the cable sheath 14 is to wrap the optical fiber cable 10 around a mandrel in a number of loops and then measure the amount of force needed to pull the micromodules 12 from the cable sheath 14. In an experiment, a 5 m strip of optical fiber cable 10 having 32 optical fibers 18 in eight micromodules 12 was wrapped around the mandrel in one, two, and three loops. The diameter of the mandrel was a multiple of the cable diameter. Mandrel diameters of 5×, 7.5×, and 10× the cable diameter were considered. For comparison, the force to pull a micromodule out of the cable sheath when the cable was laid straight is 0.15 N. Tables 2-4 provide the force required to pull the micromodule out of the cable sheath for 1 loop, 2 loops, and 3 loops wrapped around the mandrel, respectively.

TABLE 2

| Pulling Force for 1 Loop around the Mandrel | |
|---|---|
| Mandrel Diameter | Pulling Force (N) |
| 5 × Cable OD | 1.2 |
| 7.5 × Cable OD | 1.0 |
| 10 × Cable OD | 0.35 |

TABLE 3

| Pulling Force for 2 Loops around the Mandrel | |
|---|---|
| Mandrel Diameter | Pulling Force (N) |
| 5 × Cable OD | 2.2 |
| 7.5 × Cable OD | 2.0 |
| 10 × Cable OD | 1.0 |

TABLE 4

| Pulling Force for 3 Loops around the Mandrel | |
|---|---|
| Mandrel Diameter | Pulling Force (N) |
| 5 × Cable OD | 3.4 |
| 7.5 × Cable OD | 3.2 |
| 10 × Cable OD | 2.6 |

As can be seen in Tables 2-4, the force required to pull a micromodule from the cable sheath was less than 5 N in all instances, including for a cable wrapped multiple times around a relatively tight radius of 5× the cable diameter. While the force was not measured, a cable was wrapped around the mandrel five times, and the micromodule was still able to be pulled from the cable sheath. By comparison, commercially available cables in which talcum was applied to the micromodules could not be pulled from the cable sheath when wrapped around the mandrel in more than one loop.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:
1. An optical fiber cable, comprising: a cable sheath having an interior surface and an exterior surface, the interior surface defining a longitudinal bore and the exterior surface defining an outermost surface of the optical fiber cable; a plurality of micromodules disposed within the longitudinal bore, each micromodule of the plurality of micromodules comprising a micromodule jacket surrounding at least one optical fiber;

wherein the micromodule jacket of each of the plurality of micromodules comprises a first polymer composition having a first melt temperature; wherein the cable sheath comprises a second polymer composition having a second melt temperature that is less than the first melt temperature; and wherein the first polymer composition and the second polymer compositions are both low smoke, zero halogen materials; wherein the first polymer composition comprises a polypropylene-based polymer, CaCO3, and magnesium di-hydrate,(MDH); wherein the first polymer composition comprises: 40 percent by weight to 50 percent by weight of the polypropylene-based polymer; 15 percent by weight to 30 percent by weight of the CaCO3; 15 percent by weight to 30 percent by weight of the MPH; and 0 percent by weight to 2 percent by weight of stabilizers.

2. The optical fiber cable of claim 1, wherein the first polymer composition has a tensile strength of 10 MPa or less, an elongation at break of less than 300%, and a density of 1.4 g/cm$^3$ or less.

3. The optical fiber cable of claim 1, wherein the polypropylene-based polymer is a block copolymer comprising polypropylene and polyethylene.

4. The optical fiber cable of claim 1, wherein the first melt temperature is at least 200° C.

5. The optical fiber cable of claim 1, wherein second polymer composition has a melting temperature of less than 190° C.

6. The optical fiber cable of claim 1, wherein the longitudinal bore does not contain any talcum between the plurality of micromodules and the interior surface of the cable sheath.

7. The optical fiber cable of claim 1, wherein, for a 5 m length of the optical fiber cable wrapped three times around a mandrel having a mandrel diameter equal to five times a diameter of the optical fiber cable, a force required to pull one micromodule of the plurality of the micromodules out of the longitudinal bore is less than 5 N.

8. An optical fiber cable, comprising:
a cable sheath having an interior surface and an exterior surface, the interior surface defining a longitudinal bore and the exterior surface defining an outermost surface of the optical fiber cable;
a plurality of micromodules disposed within the longitudinal bore, each micromodule of the plurality of micromodules comprising a micromodule jacket surrounding at least one optical fiber; wherein the micromodule jacket of each of the plurality of micromodules comprises a first polymer composition comprising:

40 wt % to 50 wt % of a polypropylene-based polymer;
15 wt % to 30 wt % of CaCO$_3$; and
15 wt % to 30 wt % of magnesium di-hydrate (MDH); and
wherein the first polymer composition has a first melt temperature of at least 200° C.; and
wherein the cable sheath comprises a second polymer composition having a second melt temperature of less than 190° C.

9. The optical fiber cable of claim 8, wherein the first polymer composition has a tensile strength of 10 MPa or less, an elongation at break of less than 300%, and a density of 1.4 g/cm$^3$ or less.

10. The optical fiber cable of claim 8, wherein the polypropylene-based polymer is a block copolymer comprising polypropylene and polyethylene.

11. The optical fiber cable of claim 8, wherein the longitudinal bore does not contain any talcum between the plurality of micromodules and the interior surface of the cable sheath.

12. The optical fiber cable of claim 8, wherein the first polymer composition and the second polymer composition each have a limiting oxygen index of at least 32%.

13. The optical fiber cable of claim 8, wherein the longitudinal bore defines an elliptical cross-section.

14. The optical fiber cable of claim 13, wherein the cable sheath has a variable thickness between interior surface and the exterior surface and wherein the optical fiber cable further comprises at least one strength element disposed adjacent to a widest part of the variable thickness.

15. A method, comprising the step of: providing a bundle of micromodules, each micromodule comprising a micromodule jacket surrounding at least one optical fiber, wherein each micromodule jacket comprises a first low smoke, zero halogen (LSZH) polymer composition having a first melt temperature; extruding a cable sheath comprising a second LSZH polymer composition around the bundle of micromodules at a second temperature below the first melt temperature, wherein the first LSZH polymer composition is immiscible with the second LSZH polymer composition; wherein the first LSZH polymer composition comprises a polypropylene-based polymer, CaCO3, and magnesium di-hydrate (MDH); wherein the first polymer composition comprises: 40 wt° to 50 wt % of the polypropylene-based polymer; 15 wt% to 30 wt % of the CaCO$_3$; 15 wt % to 30 wt % of the MDH; and 0 wto to 2 wt % of stabilizers.

16. The method of claim 15, wherein the method does not comprise a step of applying talcum to the bundle of micromodules prior to extruding the cable sheath.

* * * * *

UNITED STATES PATENT AND TRADEMARK OFFICE
CERTIFICATE OF CORRECTION

PATENT NO. : 11,391,900 B2
APPLICATION NO. : 17/091053
DATED : July 19, 2022
INVENTOR(S) : Michael Alexander Heinz et al.

Page 1 of 1

It is certified that error appears in the above-identified patent and that said Letters Patent is hereby corrected as shown below:

In the Claims

In Column 7, Line 13, in Claim 1, delete "di-hydrate,(MDH);" and insert -- di-hydrate (MDH); --.

In Column 7, Line 18, in Claim 1, delete "MPH;" and insert -- MDH; --.

In Column 8, Line 45, in Claim 15, delete "wt°" and insert -- wt % --.

In Column 8, Line 47, in Claim 15, delete "wto" and insert -- wt % --.

Signed and Sealed this
Twenty-seventh Day of August, 2024

Katherine Kelly Vidal
*Director of the United States Patent and Trademark Office*